(12) United States Patent
Sun et al.

(10) Patent No.: US 8,774,111 B2
(45) Date of Patent: Jul. 8, 2014

(54) FAIR AND EFFICIENT CHANNEL ALLOCATION AND SPECTRUM SENSING FOR COGNITIVE OFDMA NETWORKS

(75) Inventors: Chunhua Sun, Shenzhen (CN); Wei Chen, Beijing (CN); Khaled Ben Letaief, Hong Kong (CN)

(73) Assignee: Dynamic Invention LLC, Mahe (SC)

( * ) Notice: Subject to any disclaimer, the term of this patent is extended or adjusted under 35 U.S.C. 154(b) by 200 days.

(21) Appl. No.: 13/342,839

(22) Filed: Jan. 3, 2012

(65) Prior Publication Data

US 2012/0281643 A1 Nov. 8, 2012

Related U.S. Application Data

(60) Provisional application No. 61/483,513, filed on May 6, 2011.

(51) Int. Cl.
*H04W 4/00* (2009.01)

(52) U.S. Cl.
USPC ........... 370/329; 370/322; 370/341; 370/436; 370/437; 370/444; 455/67.11

(58) Field of Classification Search
USPC ......... 370/322, 328, 329, 346, 449–457, 341, 370/348, 436, 437, 444; 455/67.11, 434, 455/450, 509
See application file for complete search history.

(56) References Cited

U.S. PATENT DOCUMENTS

| | | | |
|---|---|---|---|
| 8,107,966 B2 * | 1/2012 | Choi et al. | 455/450 |
| 8,265,623 B2 * | 9/2012 | Asanuma et al. | 455/434 |
| 2011/0098005 A1 * | 4/2011 | Selen et al. | 455/67.11 |
| 2012/0142386 A1 * | 6/2012 | Mody et al. | 455/509 |

OTHER PUBLICATIONS

Chunhua Sun, Joint Scheduling and Cooperative Sensing in Cognitive Radios: A Game Theoretic Approach, 2009, IEEE.*
Federal Communications Commission, "Spectrum Policy Task Force," Nov. 2002.
Mitola et al., "Cognitive radio: Making software radios more personal," IEEE Pers. Commun., vol. 6, pp. Aug. 13-18, 1999.
Haykin, "Cognitive radio: brain-empowered wireless communications," IEEE J. Select. Areas Commun., vol. 23, pp. 201-220, Feb. 2005.
Hwang et al., "Design and verification of IEEE 802.22 WRAN physical layer," in Proc. IEEE Crowncom, Singapore, May 15-17, 2008, pp. 1-6.
Weiss et al., "Spectrum pooling: an innovative strategy for the enhancement of spectrum efficiency," IEEE Commun. Mag., vol. 42, pp. Mar. 8-14, 2004.

(Continued)

*Primary Examiner* — Jeffrey M Rutkowski
*Assistant Examiner* — Harun Chowdhury
(74) *Attorney, Agent, or Firm* — Amin, Turocy & Watson, LLP

(57) ABSTRACT

Systems, methods, and computer-readable media for a fair and efficient channel allocation and spectrum sensing for cognitive transmission in wireless networks are presented herein. A base station can send a cognitive user device a request to sense an idle channel associated with a primary network, and in response to receiving a willingness indicator or an attribute from the cognitive user device and/or a number of idle channels associated with the primary network sensed by the cognitive user device, the base station can assign the cognitive user device to transmit data on the idle channel associated with the primary network.

18 Claims, 11 Drawing Sheets

(56) References Cited

OTHER PUBLICATIONS

Ganesan et al., "Agility improvement through cooperation diversity in cognitive radio," in Proc. IEEE Globecom, St. Louis, Missouri, USA, Nov. 28-Dec. 2, 2005, pp. 2505-2509.

Bazerque et al., "Distributed scheduling and resource allocation for cognitive OFDMA radios," in Proc. IEEE CrownCom, Singapore, May 15-17, 2008, pp. 1-6.

Knopp et al., "Information capacity and power control in single cell multiuser communications," in Proc. IEEE ICC, Seattle, WA, USA, Jun. 18-22, 1995, pp. 331-335.

Chen et al., "A game-theoretic framwork for interference management through cognitive sensing," in Proc. IEEE ICC, Beijing, China, May 19-23, 2008, pp. 131-136.

Sun et al., "Joint Scheduling and Cooperative Sensing in Cognitive Radios: A Game Theoretic Approach," in Proc. IEEE WCNC, Budapest, Hungary, Apr. 5-8, 2009, pp. 1-5.

Gradshteyn et al., Table of Integrals, Series, and Products, San Diego, CA: Academic Press, sixth ed., 2000.; http://books.google.com/books?hl=en&lr=&id=h4y-36vKIZgC&oi=fnd&pg=PP2&dq=Gradshteyn+Table+of+Integrals,+Series,+and+Products+sixth+ed&ots=cQfkCJK7Ag&sig=TECZ1mhrmNn-SpwWaaG9vYb4o6g#v=onepage&q&f=false.

\* cited by examiner

FAIR AND EFFICIENT CHANNEL ALLOCATION AND SPECTRUM SENSING FOR COGNITIVE OFDMA NETWORKS

PRIORITY CLAIM

This application claims priority to U.S. Provisional Patent Application Ser. No. 61/483,513, filed on May 6, 2011, entitled "FAIR AND EFFICIENT CHANNEL ALLOCATION AND SPECTRUM SENSING FOR COGNITIVE OFDMA NETWORKS". The entirety of the aforementioned application is incorporated by reference herein.

TECHNICAL FIELD

This disclosure relates generally to wireless networks including, but not limited to, fair and efficient channel allocation and spectrum sensing for cognitive transmission in wireless networks.

BACKGROUND

Intense competition for spectrum usage has arisen due to the increasingly widespread deployment of high speed networks. Measurements from the Federal Communication Commission (FCC) indicate that utilization of the licensed spectrum ranges from fifteen percent to eight-five percent. Aiming to make full use of underused spectrum resources, the IEEE 802.22 Wireless Region Area Network (WRAN) Group has proposed using spectrum between 54 megahertz (MHz) and 862 MHz in conjunction with cognitive radio techniques to efficiently exploit the existence of spectrum holes.

Use of orthogonal frequency division multiple access (OFDMA) has also been proposed in exploiting the existence of spectrum holes, since orthogonal frequency division multiple access schemes typically are agile in dynamically selecting and allocating sub channels. Cognitive radio users can use the licensed sub channels as long as the spectrum owners or primary users are absent at some particular time slot. By sensing the sub channels and dynamically selecting idle sub channels, cognitive users can flexibly exploit spectrum holes without changing the configuration and causing interference to the primary system.

Spectrum holes derived from multiple primary sub channels through use of spectrum sensing can typically be scheduled to multiple cognitive radios. Nevertheless, traditional scheduling algorithms for cognitive orthogonal frequency division multiple access systems have been designed separately from the spectrum sensing aspects necessary to more effectively exploit the ascertained spectrum holes.

Traditional scheduling algorithms for cognitive orthogonal frequency division multiple access can be summarized as: (1) schedule the user with the best channel quality among all the cognitive users for each of the idle channels; or (2) schedule the user with the best channel quality among all the sensing users. High system throughput can be achieved by scheduling users with the best channel quality among all the cognitive users for each of the idle channels, since such a scheduling scheme exploits full multiuser diversity. Under this scheme however, unfairness is introduced to sensing users as the energy for spectrum sensing is not negligible for energy constrained networks. Absolute fairness for sensing users can be satisfied in the second case but the order of the multiuser diversity in the cognitive orthogonal frequency division multiple access is generally low and throughput constrained. Accordingly, there is a tradeoff between fairness of sensing users and throughput for cognitive orthogonal frequency division multiple access systems.

The above-described deficiencies are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

In accordance with various embodiments, the subject application pertains to a universal broadband cognitive system, where multiple cognitive users with one base station (BS) coexist with multiple primary users through orthogonal frequency division multiple access based air interfaces. In order to exploit the benefits of spectrum sensing in the physical (PHY) layer and multiuser diversity in the media access control (MAC) layer, a stimulus-based cross-layer framework for cognitive radios can be used. Such a stimulus-based cross-layer framework can provide incentives for selfish cognitive users to participate in spectrum sensing while fairly and efficiently scheduling all the cognitive users to access the idle channels. In the proposed universal broadband cognitive system, reward in terms of higher scheduling priority in the media access control layer is provided as a stimulus for spectrum sensing in the physical layer. Furthermore, multiuser diversity is also exploited to guarantee a high system throughput.

In accordance with one or more various embodiments, the subject application describes a method that comprises on a random-polling basis, dispatching to a first cognitive user device a request to perform sensing of an idle primary channel, in response to the request to perform sensing of the idle primary channel, receiving from the first cognitive user device a willingness indicator, and as a function on the willingness indicator and a number of idle primary channels sensed by the first cognitive user device, scheduling the first cognitive user device to transmit data over the idle primary channel.

Additionally, in accordance with one or more further embodiments, the subject application discloses a system, comprising: a scheduling component configured to send a first cognitive user device a request to sense an idle channel associated with a primary network; and in response to receiving a willingness indicator from the first cognitive user device and a number of idle channels associated with the primary network sensed by the first cognitive user device, the scheduling component configured to assign the first cognitive user device to transmit data on the idle channel associated with the primary network.

In accordance with yet further embodiments, the subject application describes a computer-readable medium storing computer executable instructions for causing a processor to execute instructions, the computer executable instructions, comprising: instructions for dispatching to a first cognitive user device a request to perform sensing of an idle primary channel; instructions for receiving from the first cognitive user device a willingness indicator, wherein the willingness indicator is received in response to the request to perform sensing of the idle primary channel; and instructions for scheduling the first cognitive user device to transmit data over the idle primary channel, wherein the scheduling of the first cognitive user device to transmit over the idle primary channel is a function of a number of idle primary channels sensed by the first cognitive user device.

In accordance with still yet further embodiments, the subject application discloses a method, comprising: receiving a request from a base station to sense an idle channel associated with a primary network; and in response to the request from the base station, sending a willingness indicator to the base station indicating a willingness to sense the idle channel associated with the primary network.

Moreover, in further embodiments, the subject application describes a system, comprising: a sensing module configured to receive a request to sense an idle channel associated with a primary network; and a willingness module configured to return a willingness indicator in response to receipt of the request to sense the idle channel associated with the primary network.

In yet further embodiments, the subject application describes a computer-readable medium storing computer executable instructions for causing a processor to execute instructions, the computer executable instructions, comprising: instructions for receiving a request from a base station to sense an idle channel associated with a primary network; and instructions for sending, in response to receipt of the request from the base station, a willingness indicator indicating a willingness to sense the idle channel associated with the primary network, wherein the willingness to sense the idle channel associated with the primary network is expressed as a probability.

In still yet further embodiments, the subject application describes a method that comprises on a random-polling basis, dispatching to a first cognitive user device a request to perform sensing of an idle primary channel; in response to the request to perform sensing of the idle primary channel, receiving from the first cognitive user device an attribute that indicates a capability of the first cognitive user device to perform sensing of the idle primary channel; and as a function of the attribute and a number of idle primary channels sensed by the first cognitive user device, scheduling the first cognitive user device to transmit data over the idle primary channel.

In yet further embodiments, the subject application describes a system, comprising: a scheduling component configured to: send a first cognitive user device a request to sense an idle channel associated with a primary network; and in response to receiving from the first cognitive user device an attribute that indicates an ability of the first cognitive user device to sense the primary network or a number of idle channels associated with the primary network sensed by the first cognitive user device, assign the first cognitive user device to transmit data on the idle channel associated with the primary network.

In further embodiments, the subject application describes a computer-readable storage device storing computer executable instructions for causing a processor to execute instructions, the computer executable instructions, comprising: instructions for dispatching to a first cognitive user device a request to perform sensing of an idle primary channel; instructions for receiving from the first cognitive user device an attribute that denotes spare capacity of the first cognitive user device to perform sensing of the idle primary channel, wherein the attribute is received in response to the request to perform sensing of the idle primary channel; and instructions for scheduling the first cognitive user device to transmit data over the idle primary channel, wherein the scheduling of the first cognitive user device to transmit over the idle primary channel is a function of a number of idle primary channels sensed by the first cognitive user device.

In yet further embodiments, the subject application describes a method, comprising: receiving a request from a base station to sense an idle channel associated with a primary network; and in response to the request from the base station, sending an attribute to the base station indicating an availability of allocable resources to sense the idle channel associated with the primary network.

In still yet further embodiments, the subject application describes a system, comprising: a sensing module configured to receive a request to sense an idle channel associated with a primary network; and a willingness module configured to return an attribute in response to receipt of the request to sense the idle channel associated with the primary network.

In yet one or more further embodiments, the subject application describes a system, comprising: means for receiving a request from a base station to sense an idle channel associated with a primary network; and means for sending, in response to receipt of the request from the base station, am attribute indicating available resources to sense the idle channel associated with the primary network, wherein the attribute indicating resources to sense the idle channel associated with the primary network is represented as a probability.

The following description and the annexed drawings set forth in detail certain illustrative aspects of the disclosed subject matter. These aspects are indicative, however, of but a few of the various ways in which the principles of the subject application can be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
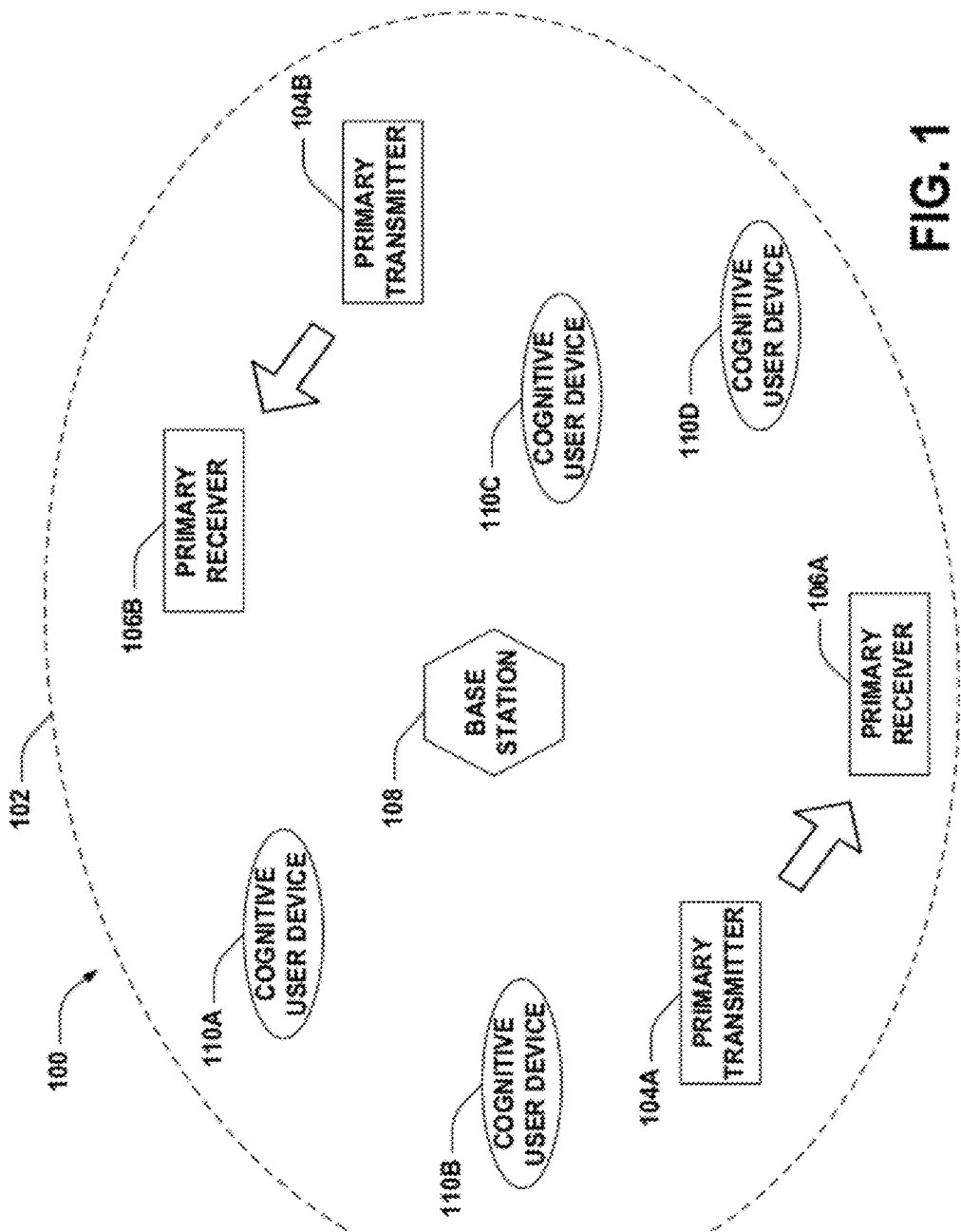
FIG. 1 illustrates a block diagram of a large coverage cognitive radio system that can opportunistically access the licensed spectrum of randomly distributed and/or dispersed small-coverage primary user systems.

Various non-limiting embodiments of systems, methods, and apparatus presented herein opportunistically exploit, to the benefit of secondary user devices, spectrum holes left by primary communication systems without unduly interfering with communications by primary user devices.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to select appropriate relay stations for secondary transmitter and secondary receivers randomly situated within a cognitive radio network, wherein the secondary receiver and secondary transmitter can base their respective decisions as to which relay station is the most suitable relay station at least in part on links between the relay station and the secondary receiver and the secondary transmitter and the relay station.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Turning to the figures, FIG. 1 illustrates a large coverage cognitive radio system 100 that can opportunistically access the licensed spectrum of randomly distributed and/or dispersed small-coverage primary user systems. The large coverage cognitive radio system 100 can include a wireless regional area network system 102 that can provide wireless communications for a college campus, town, or moderately sized rural area. Generally, the coverage area or cell radius of the wireless regional area network system 102 can range from less than 2 kilometers to in excess of 10 kilometers. The wireless regional area network 102 can include a multitude of primary user devices (e.g., primary transmitters 104A and 104B and primary receivers 106A and 106B) randomly situated throughout the coverage ambit and within the cell radius of the wireless regional area network 102.

Wireless regional area network system 102 can also include a cognitive base station 108 (referred to herein as base station 108) as well as numerous cognitive user devices 110A-110D. It should be understood that while FIG. 1 depicts but one base station 108, a plurality of base stations 108 can be positioned throughout the coverage area circumscribed by the wireless regional area network system 102. The positioning of base station 108 within the circumscribed ambit of the wireless regional area network system 102 can be ordered, random, or dispersion can be performed in an ad hoc manner. It should further be comprehended that while only two pairs of respectively communicating primary transmitters 104A and 104B and primary receivers 106A and 106B are illustrated in FIG. 1, a fewer or greater number of primary transmitters and/or primary receivers can, at any point in time, be operational within the wireless regional area network system 102. Similarly, it should be further noted, that while only cognitive user devices 110A-110D have been depicted as being included within the coverage area of wireless regional area network 102, this has been undertaken mainly for purposes of ease of depiction, and that a greater or lesser number of cognitive user devices 110A-110D can, at any point in time, be operational or extant within the broadcast boundaries circumscribed by wireless regional area network 102.

Primary user devices 104A, 104B, 106A, and 106B can be associated with one or more wireless carrier or primary communication systems either in the temporal, frequency, or spatial domains. Generally, the one or more wireless carrier or primary communication systems will own or have been allocated exclusive use of particular bands or sub-bands of wireless spectrum by a regulatory organization, for example. Thus, primary user devices 104A, 104B, 106A, 106B will typically be tightly associated and/or exclusively utilize the resources (e.g., spectrum) provided by the one or more wireless carrier or primary communication systems. As will be recognized by those of ordinary skill, utilization of the allocated wireless spectrum exclusively by primary user devices 104A, 104B, 106A, and 106B can be extremely wasteful and inefficient since the full extent of the allocated wireless spectrum need not be fully employed for the majority of time. In fact, one survey conducted to find the extent to which wireless spectrum is currently being utilized shows that some radio channels are employed less than one percent of the time, and the average occupancy over all frequency bands is only 5.2 percent. The survey also found that the maximum total spectrum occupancy for New York City in the 30-300 MHz sub-band, for example, during one measurement period was, surprisingly, only 13.1 percent, and that even during peak hours of usage, one could find free spaces in the spectrum of the public bands.

As intimated above, primary user devices 104A, 104B, 106A, or 106B, can have a transitory operability thus, some primary user devices 104A, 104B, 106A, or 106B while being exclusively affiliated with a particular wireless carrier or specific primary communication system, can at times be inactive and thus not employ the facilities provided by the wireless carrier or primary communication systems to which they are affiliated.

Cognitive user devices 110A-110D can be devices that opportunistically exploit underutilized spectrum holes left by primary communication systems or one or more wireless carriers, either in the temporal, frequency, or spatial domains, without unduly interfering with the regular transmissions conducted by primary user devices 104A, 104B, 106A, or 106B. Cognitive user devices 110A-110D therefore can employ any practical dynamic spectrum access scheme to gain access to resources provided by primary communication systems or the one or more wireless carriers.

Base station 108 can be a device that receives signals and/or packets from one or more primary user devices 104A, 104B, 106A, or 106B and/or cognitive user devices 110A-110D and rebroadcasts the received signals and/or packets either in the same frequency or on a different frequency, to receiving devices such as other cognitive user devices or one or more primary user devices. Typically base station 108 can serve as an interconnection device that moves or forwards packets, frames, and/or signals between segments in a wired/wireless communication network, and normally can receive packets, frames, and/or signals in one form and thereafter retransmit the received packets, frames, and/or signals in a different form. Generally, base station 108 receives packets, frames, and/or signals from a transmitter device, such as primary transmitters 104A or 104B, amplifies the received signal, shifts the signals in frequency, and rebroadcasts the frequency shifted signals. The rebroadcast frequency shifted signals can be received by other base stations, if necessary, further amplification, frequency shifting, and rebroadcast of the signals can be carried out, or the frequency shifted signals can be received by a primary receiver 106A or 106B or other cognitive user devices 110A-110D.

In connection with primary user devices 104A, 104B, 106A, or 106B and cognitive user devices 110A-110D, typical examples of these devices include mobile devices, cell phones, personal digital assistants (PDAs), tablet computers/communication devices, consumer and/or commercial wired/wireless devices and electronic components, such as wired/wireless routers, wired/wireless hubs, wired/wireless access points, computers (e.g., desktop, laptop, net book, . . . ), and the like.

Figure 2:
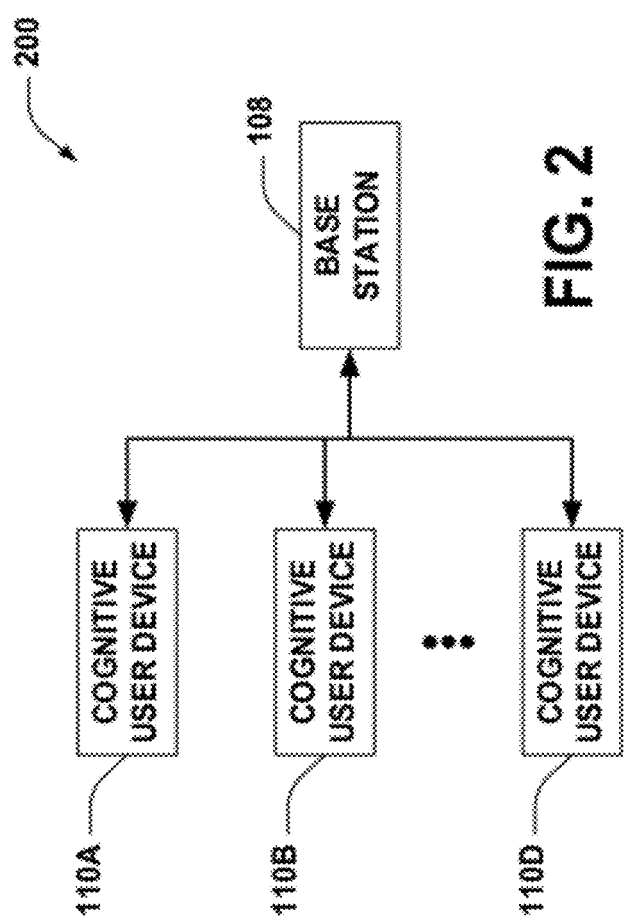
FIG. 2 illustrates a block diagram of depicts an illustrative interaction between a base station and cognitive user devices in accordance with an embodiment.

FIG. 2 depicts an illustrative interaction between a base station 108 and cognitive user devices 110A-110D, wherein cognitive user devices 110A-110D can be communicatively coupled to base station 108. In this instance, base station 108 can receive a willingness indicator from each of the cognitive user devices 110A-110D (e.g., an indicator of the willingness of each cognitive user device to partake in spectrum sensing activities; typically expressed as a probability) as well as spectrum sensing information compiled and dispatched by each cognitive user device 110A-110D that indicates the various idle channels or available slots associated with the primary network (e.g., primary transmitters and primary receivers 104A, 104B, 106A, and/or 106B) detected or sensed by each or the cognitive user devices 110A-110D. In response to receiving or otherwise obtaining willingness indicators and/ or spectrum sensing information from diverse cognitive user devices 110A-110D, base station 108, as a function of the received willingness indicators, can randomly select one or more of the cognitive user devices 110A-110D to perform spectrum sensing activities. The selection of prospective cognitive user devices 110A-110D to perform spectrum sensing activities can typically be based on the returned willingness indictors received by base station 108 from each cognitive user device 110A-110D. Thus, the higher the probability of a willingness to partake in spectrum sensing activities manifested by a cognitive user device, the greater the likelihood base station 108 will select it, and the more likely base station 108 is to commensurately reward such a cognitive user device with higher scheduling priority for its data transmissions.

Figure 3:
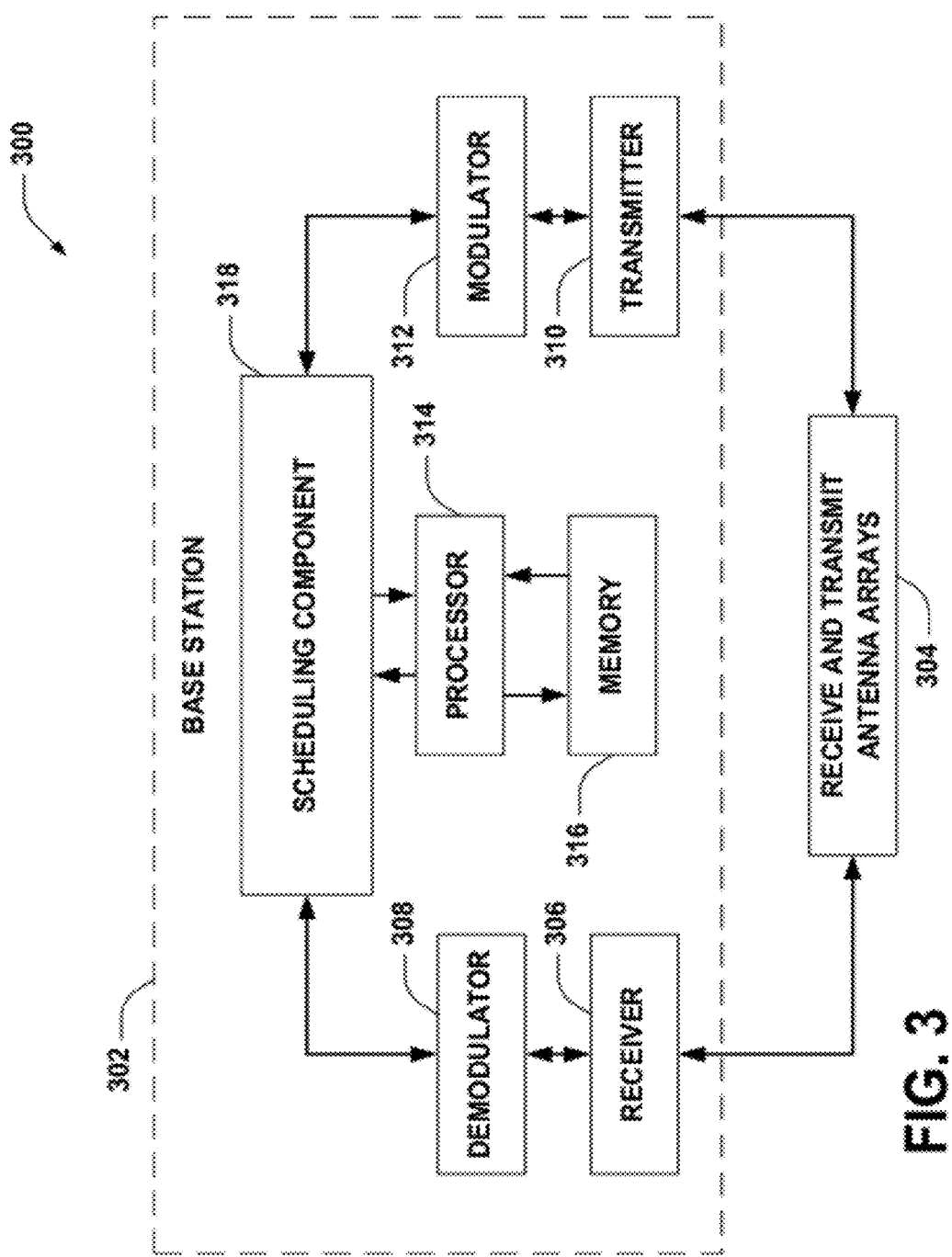
FIG. 3 illustrates a block diagram of a system that effectuates fair and efficient channel allocation and spectrum sensing in a wireless regional area network, in accordance with an embodiment.

FIG. 3 depicts a system 300 that effectuates fair and efficient channel allocation and spectrum sensing in a wireless regional area network. System 300 comprises base station 302 with a receiver 306 that receives signals through receive and transmit antenna arrays 304 from one or more primary devices (e.g., primary devices 104A, 104B, 106A, or 106B) and cognitive user devices (e.g., cognitive user devices 110A-110D) operating within the coverage area or cell radius of the wireless regional area network system 102. Base station 302 also includes a transmitter 310 that transmits, through receive and transmit antenna arrays 304, to one or more primary user devices (e.g., primary transmitters 104A and 104B and primary receivers 106A and 106B) and cognitive user devices (e.g., cognitive user devices 110A-110D) operational or extant within the cell coverage area provided by the wireless regional area network system 102. Receiver 306 can receive information from receive and transmit antenna arrays 304 and is operatively associated with demodulator 308 that demodulates received information. Demodulated symbols are analyzed by a processor 314 that can be a processor dedicated to analyzing information received by receiver 306 and/or generating information for transmission by a transmitter 310, a processor that controls one or more components of base station 302, and/or a processor that both analyzes information received by receiver 306, generates information for transmission by transmitter 310, and controls one or more components of base station 302, and which is coupled to a memory 316 that stores data to be transmitted to or received from one or more primary user devices (e.g., primary user devices 104A, 104B, 106A, or 106B) or cognitive user devices (e.g., cognitive user devices 110A-110D), and/or any other suitable information related to performing the various actions and functions set forth herein. Processor 314 is further coupled to a scheduling component 318 that, as will be described infra, effectuates fair and efficient channel allocation and spectrum sensing in a wireless regional area network. Modulator 312 can multiplex a frame for transmission by transmitter 310 through receive and transmit antenna arrays 304 to one or more primary user devices or cognitive user devices that exist within the coverage area of the wireless regional area network system. Although depicted as being separate from processor 314, it is to be understood that scheduling component 318 can be part of processor 314 or a number of processors (not shown).

Scheduling component 318 periodically and/or continuously receives willingness indicators from cognitive user devices (e.g. cognitive user devices 110A-110D) dispersed throughout the coverage area provided by wireless regional area network 102. Additionally and/or alternatively, scheduling component 318 can continuously and/or periodically receive spectrum sensing information that has been compiled and dispatched by cognitive user devices extant in the coverage area provided by wireless regional area network 102. Typically, the spectrum sensing information indicates the various idle channels and/or available slots associated with the primary network as detected or sensed by each respective cognitive user device 110A-110D.

In order to avoid harmful interference to primary user device communication, base station 302 only allows cognitive user devices to access the multiple sub channels in the absence of utilization by primary user devices. Thus, each scheduling slot consists of two time periods: a sensing period followed by a data transmission period. Scheduling component 318 and thus selects a particular number of cognitive users to sense the primary channels in a particular sensing period. The selection of sensing users typically follows a random-polling process, wherein the selection of sensing users is based on a willingness indicator $\theta_m$ (e.g., the willingness indicator of the m-th cognitive user device to sense the channels) and $\theta=[\theta_1, \ldots, \theta_M]^T$ is a willingness indicator vector. The higher the value of the willingness indicator $\theta_m$, the more willing the m-th cognitive user device is to perform sensing operations (e.g., the higher the probability that the m-th cognitive user device will be selected by base station 302 to perform spectrum sensing activities).

When available subchannels are detected through spectrum sensing activities by the cognitive user devices, for example, base station 302, through facilities provided by scheduling component 318, can schedule cognitive user devices to transmit data during the data transmission period. Thus, scheduling component 318, in order to balance the tradeoff between maximizing system throughput and fairness for cognitive user devices partaking in sensing activities, selects a particular number of cognitive user devices to partake in spectrum sensing activities, wherein the selection of the cognitive user devices to participate in spectrum sensing activities can be based, for example, on the sensing willingness indicator $\theta$, and schedules some cognitive user devices to access the idle subchannels, rewarding cognitive user devices that participated in the earlier spectrum sensing activities and/or have expressed, through the sensing willingness indicator $\theta$, a willingness to participate in spectrum sensing activities. The higher the value of $\theta$ associated with a particular cognitive user device, the more rewards are granted that cognitive user device. For instance, a cognitive user device that elicits a $\theta=1.0$ (a 100% probability of participating in spectrum sensing activities) can typically always be selected by base station 302 (and scheduling component 318) for spectrum sensing activities, however, such a cognitive user device, because selection of users is generally performed using a random-polling process, may not be selected in every instance. Nevertheless, as a reward for indicating a 100% willingness to participate in spectrum sensing activities such a cognitive user device can be provided a commensurately higher scheduling priority over other cognitive user devices that did not indicate such a high degree of willingness to participate in spectrum sensing endeavors.

In this application, for ease of exposition, the following notation is utilized: $\mathcal{U}$—the set of M cognitive user devices extant within the wireless regional area network; $\mathcal{U}^S$—the set of sensing users, $\mathcal{U}^{\bar{S}}=\mathcal{U}/\mathcal{U}^S$; i—the number of users selected by scheduling component 318 for spectrum sensing, $i=|\mathcal{U}^S|=1, 2, \ldots, N$; $T_i$—the number of sets for selecting i cognitive user devices from $S$, and $T=\binom{M}{i}$; $\mathcal{U}_{i,s}$—the S-th set of i out of M cognitive user devices, $S=1, 2, \ldots, T_i$; $l_j$—the j-th element $l_j$ denotes the number of channels the j-th cognitive user device senses, $j=1, 2, \ldots, i$; $Z_i$—the number for $l_j$, which satisfies $\Sigma^i_{j=1} l_j=N$; moreover $Z_i=\binom{N-1}{i-1}$; K—the j-th element K(j) is the threshold when one cognitive user device senses j channels, j=1, 2, . . . , N; and $\Gamma_{K(j),n}$—the K(j)-th largest instantaneous channel gain in the set $\mathcal{U}^S$ for channel n.

Scheduling component 318 accordingly selects cognitive user devices for sensing the N primary channels on a random polling basis, whereupon scheduling component 318 randomly transmits/sends a request for cognitive user device m to perform spectrum sensing through, for example, a narrow-band channel. Feedback from the cognitive user device indicating information is provided as $ACK_m$, where $ACK_m=1$ with probability $\theta_m$ and $ACK_m=0$ with probability $1-\theta_m$. The polling process repeats until scheduling component 318 has selected i sensing users in the set $\mathcal{U}^S$, each of which is willing to sense $l_j$, j=1, 2, . . . , i primary channels, respectively. Moreover, there exists $\Sigma^i_{j=1} l_j = N$.

In order to achieve high throughput for the overall wireless regional area system and to guarantee fairness for sensing users, scheduling component 318, during the data transmission period, takes into account the sensing contributions provided by each cognitive user device. The sensing contribution is typically a function of the number of channels that a particular cognitive user device senses which can be determinative of its corresponding priorities to access the idle primary channels.

Accordingly, for purposes of scheduling cognitive user devices to access idle primary channels, scheduling component 318, during the scheduling phase, provides greater access to idle primary channels to cognitive user devices that make a higher sensing contribution; higher priority to primary channels is distributed to cognitive user devices in the set of sensing cognitive user devices $\mathcal{U}^S$ since it is these devices that make a greater contribution to the functioning of the cognitive radio network than non-sensing cognitive user devices $\mathcal{U}^{\underline{S}}$.

It should be noted nevertheless, that heterogeneous priorities can be assigned to different sensing cognitive user devices in the set of cognitive user devices $\mathcal{U}^S$. Thus, for example, cognitive user device $j_1$ can be provided a higher priority than cognitive user device $j_2$ if cognitive user device $j_1$ made a greater contribution to the sensing activities than cognitive user device $j_2$, where $l_{j_1} > l_{j_2}$. Accordingly, for an idle channel n, a cognitive user device can be scheduled by scheduling component 318 in accordance with the following illustrative praxis: select a cognitive user device $m_{n,s}*$ with the largest channel gain in the cooperative set $S^S$ (e.g. the set of sensing cognitive user devices); and finding the number of channels, $l_{m_{n,s}^*}$, that the cognitive user device $m_{n,s}*$ senses. Where the largest channel gain is larger than or equal to $$\Gamma_{K\left(l_{m_{n,s}^*}\right),n},$$

then the cognitive user device $m_{n,s}*$ in the cooperative set $\mathcal{U}^S$ of sensing cognitive user devices can be scheduled; otherwise, the cognitive user device with the largest channel gain in the set of uncooperative non-sensing cognitive user devices $\mathcal{U}^{\underline{S}}$ can be scheduled.

The global parameter K(j) in the global threshold vector, K, is set in such a way that the larger j is, the larger K(j) is, then the lower the threshold $\Gamma_{K(j),n}$ is. In such a manner, fairness for sensing cognitive user devices that make different contributions to the sensing activities undertaken by scheduling component 318 can be satisfied and system throughput can be enhanced as the channel gain of the scheduled cognitive user device in the set of cooperating sensing cognitive user devices $$\mathcal{U}^S$$

is sufficiently large. Once the global threshold vector K is properly set by scheduling component 318, all the cognitive user devices will correspondingly determine their behaviors in the spectrum sensing.

Figure 4:
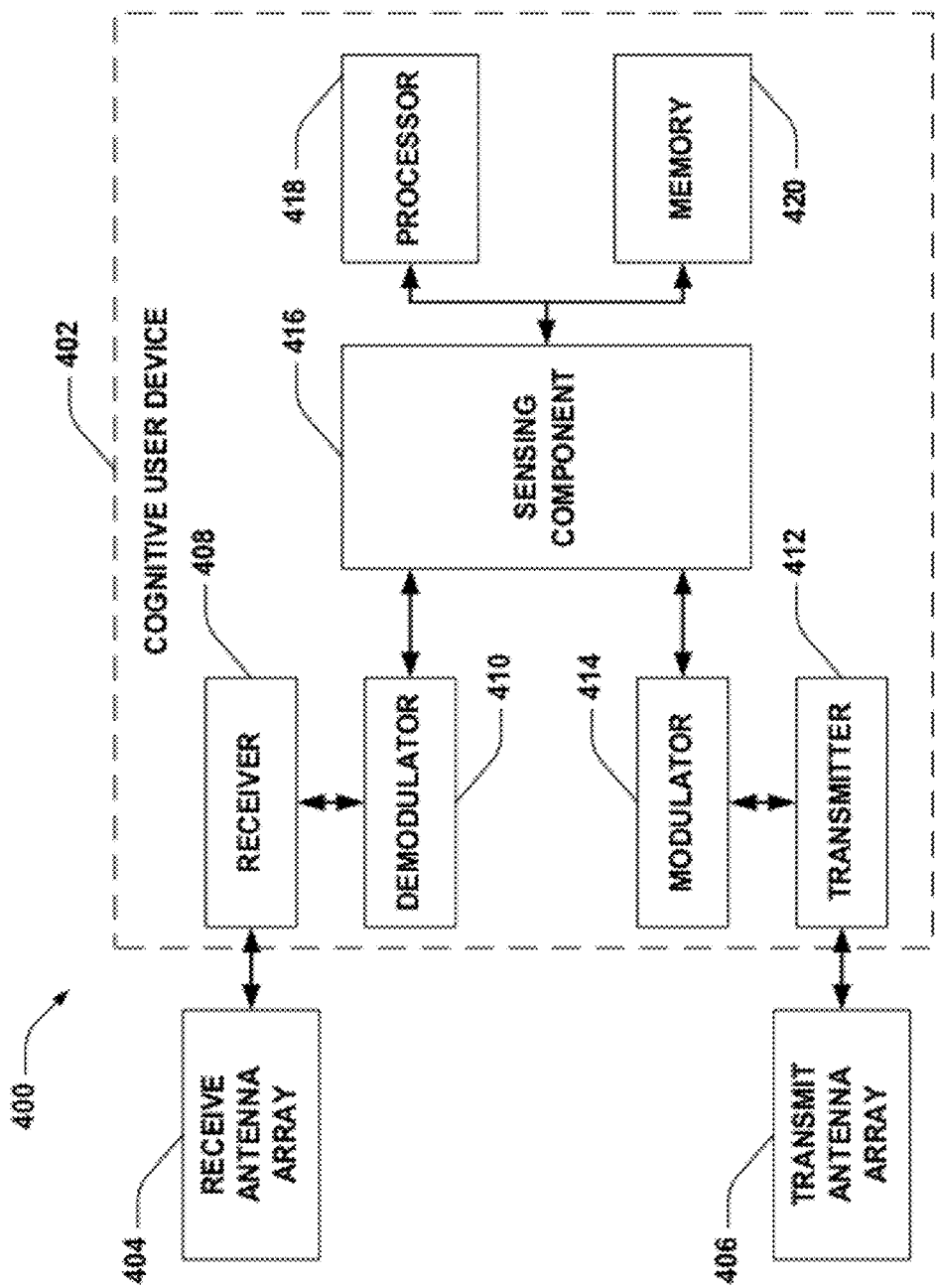
FIG. 4 illustrates a block diagram of an illustrative cognitive user device, in accordance with an embodiment.

FIG. 4 depicts an illustrative cognitive user device 402 that can include a transmitter side and a receiver side. The receiver side of cognitive user device 402 can include receiver 408 that receives signals from one or more base stations (e.g., base station 108) through a plurality of receive antennas provided by receive antenna array 404. Receiver 408 can receive information from receive antenna array 404 and is operatively associated with demodulator 410 that demodulates the received information. Demodulated symbols can be analyzed by a processor 418 that can be a processor dedicated to analyzing information received by receiver 408 and/or generating information for transmission by transmitter 412, a processor that controls one or more components of cognitive user device 402, and/or a processor that both analyzes information received by receiver 408, generates information for transmission by transmitter 412, and controls one or more components of cognitive user device 402, and which is coupled to a memory 420 that stores data to be transmitted to or received from base station 108, and/or any other suitable information related to performing the various actions and functions set forth herein. Processor 418 is further coupled to a sensing component 416 that, as will be described subsequently, can receive a solicitation from base station 108 (or base station 302) enquiring whether or not the cognitive user device 402, within which sensing component 416 is included, is willing to participate in sensing activities on behalf of base station 108 (or base station 302). Further, sensing component 416 can periodically and/or continuously perform spectrum sensing of the primary communication network.

The transmission side of cognitive user device 402 can include transmitter 412 that transmits to one or more base stations 108 through transmit antenna array 406. Typically, transmitter 412 is coupled to modulator 414 that can multiplex frames for transmission by transmitter 412 via transmit antenna array 406 to base station 108. Although depicted as being separate from processor 418, it is to be appreciated that sensing component 416 can be part of processor 418 or a number of processors (not shown).

Sensing component 416 can typically be employed to respond to a command directed to cognitive user device 402 from base station 108 (or base station 302), via a narrow-band control channel, requesting that cognitive user device 402 respond with an indicator that manifests the cognitive user device's 402 willingness to partake in sensing activities on behalf of base station 108 (or base station 302) and the beneficial functioning of wireless regional area network system 102. Typically, cognitive user device 402, through facilities provided by sensing component 416, can respond to base station 108 either with feedback indicating its willingness to participate in spectrum sensing activities (e.g., $ACK_m=1$ with a probability $\theta_m$) or with feedback indicating its unwillingness to participate in spectrum sensing activities (e.g., . . . , $ACK_m=0$ with a probability $(1-\theta_m)$).

Additionally, sensing component 416, as a function of either dispatching or not dispatching a willingness indicator in response to the request from base station 108, can also be responsible for conducting spectrum sensing of the ambient primary network, wherein the number of channels that the cognitive user device 402 senses and reports to base station 108 can be utilized by the base station 108 (e.g., via scheduling component 318) to ascertain the respective sensing contribution that the cognitive user device 402 made to the functioning of the system, as well as the corresponding priorities to access the idle channels conferred on cognitive user device 402. Thus, the higher the sensing contribution made by cognitive user device 402, the higher the access priority to idle channels that will be conferred upon it by base station 108.

Figure 5:
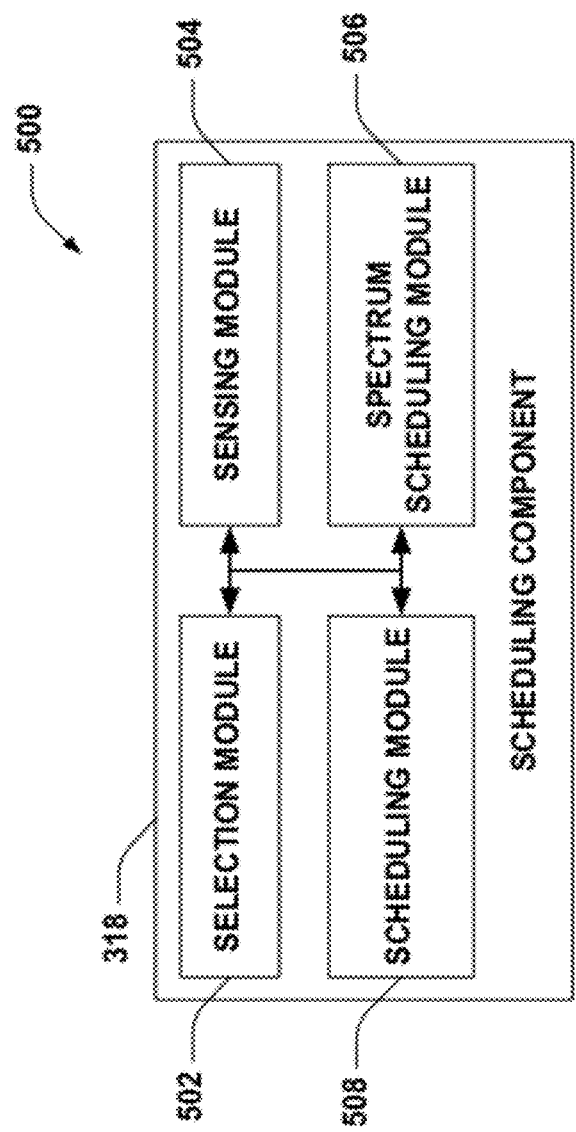
FIG. 5 illustrates a block diagram of a scheduling component, in accordance with an embodiment.

FIG. 5 provides a more detailed depiction of scheduling component 318. As illustrated, scheduling component 318 can comprise selection module 502 that can that can select a number of cognitive user devices for sensing the primary channels. The selection of the cognitive user devices can be effectuated on a random polling basis, wherein scheduling component 318 (and selection module 502), using a narrowband channel and on a random basis, for instance, transmits a request to a cognitive user device, wherein the request solicits the cognitive user device to perform sensing of the primary channels. In response to the solicitation from the scheduling component 318 (and selection module 502), the selected cognitive user devices can feedback to scheduling component 318 (and selection module 502) an acknowledgment that indicates the cognitive user devices' willingness or unwillingness to partake in spectrum sensing activities. Where the acknowledgement fed back from the cognitive user device expresses a willingness to undertake spectrum sensing activities on behalf of scheduling component 318, selection module 502 can consign such a cognitive user device to a set of cooperating cognitive user devices. On the other hand, where the acknowledgment fed back from the cognitive user device indicates an unwillingness to undertake spectrum sensing activities on behalf of scheduling component 318 selection module 502 can assign such a cognitive user device to a set of uncooperative cognitive user devices. It should be noted in the context of the utilization of the term "set" as set forth herein, a set can include a cognitive user device or one or more cognitive user devices.

Additionally, scheduling component 318 can also include sensing module 504 that can ascertain the sensing contribution that a cognitive user device makes to the overall performance of the wireless regional area network 102. Sensing module 504 can ascertain the sensing contribution made by each cognitive user device by determining the number of channels that a particular cognitive user device senses. The number of channels that a cognitive user device senses can be determinative of the corresponding priorities that scheduling component 318 will assign for the cognitive user device to access the idle channels.

Further, scheduling component 318 can include spectrum scheduling module 506 that provides greater access to either primary channels to cognitive user devices that make a higher sensing contribution. Thus, spectrum scheduling component 506 provides higher access priority to primary channels to cognitive user devices that have been consigned to the set of cooperating user devices and commensurately lower access priorities to cognitive user devices that are not included in this set of cooperating cognitive user devices. Nevertheless, in order not to entirely preclude non-cooperating cognitive user devices from access to idle primary channels, as noted above, heterogeneous priorities can also be assigned to cognitive user devices.

Furthermore, scheduling component 318 can also include scheduling module 508 that can schedule a cognitive user device to a particular idle channel by selecting the cognitive user device with the largest channel gain, wherein the selected cognitive user device with the largest channel gain is in the cooperative set. Having selected a cognitive user device with the largest channel gain, scheduling module 508 can ascertain/determine the number of channels that the cognitive user device sensed during the sensing period and thereafter schedule the cognitive user device to access the idle primary channel giving priority to cognitive user devices that sensed the most number of channels in the set of cooperating cognitive user devices. Once scheduling module 508 has scheduled cognitive user devices with the largest channel gains and/or the cognitive user devices that have sensed the most number of channels, scheduling module 508 can schedule cognitive devices in the non-cooperating set with the largest channel gains to access idle primary channels.

Figure 6:
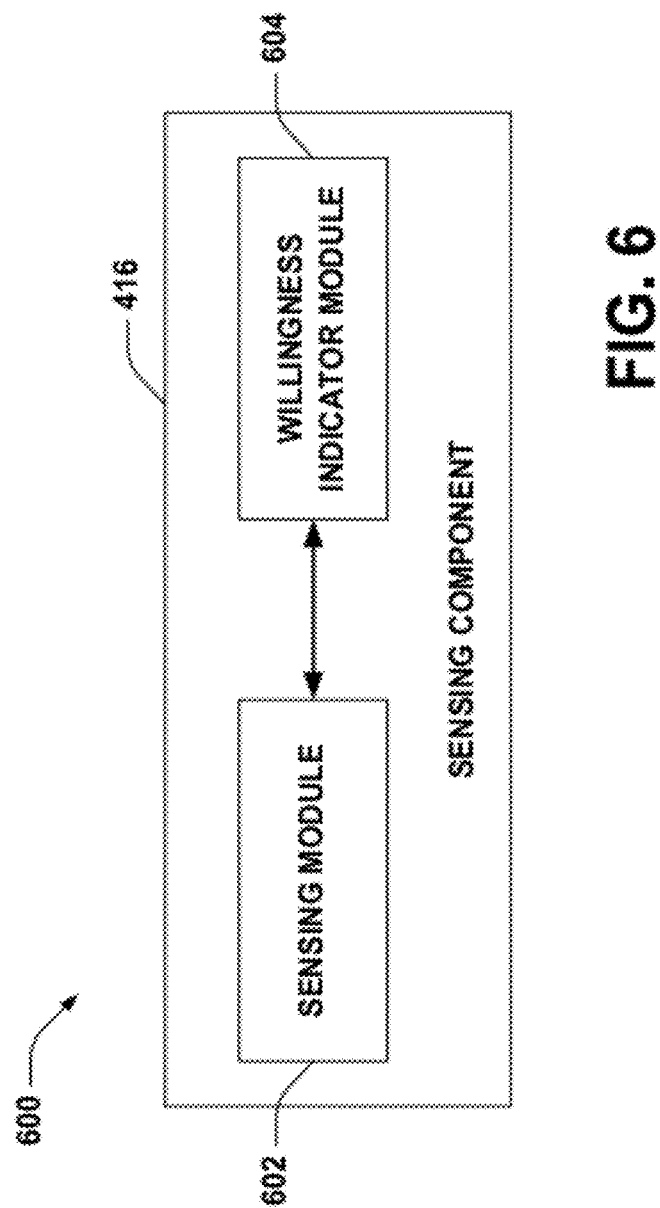
FIG. 6 illustrates a block diagram of a sensing component, in accordance with an embodiment.

FIG. 6 provides a more detailed depiction of sensing component 416. Sensing component 416 can include sensing module 602 that can conduct spectrum sensing of the ambient primary network, wherein the number of channels that the cognitive user device, within which sensing component 416 is located, senses and reports to base station 108 can be utilized to ascertain the respective sensing contribution that the cognitive user device (through facilities provided by sensing module 602) made to the functioning to the overall system. As noted above, the number of channels that the cognitive user device senses as well as the respective channel gain can be utilized to assign priorities for access to idle channels associated with the primary network.

Additionally, sensing component 416 can also include willingness indicator module 604 that can respond to a command directed to the cognitive user device from base station 102 requesting that the cognitive user device respond with an indication that manifests the cognitive user device's willingness to partake in sensing activities on behalf of base station 108. As noted above, willingness indicator module 604 can respond to base station 108 with feedback indicating a probability associated with the cognitive user device's willingness to partake in spectrum sensing activities.

Figure 7:
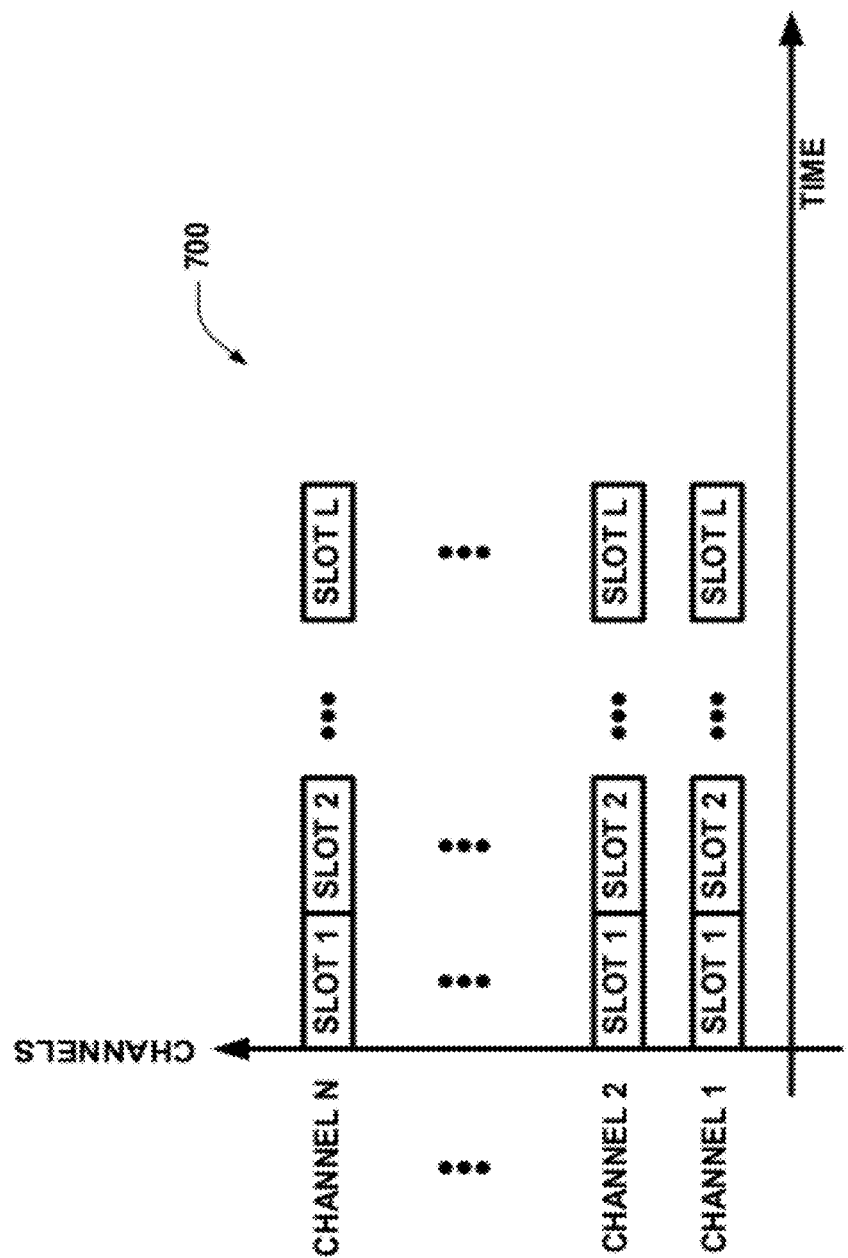
FIG. 7 provides depiction of the number of channels extant in the primary network that can potentially be exploited by the secondary network during moments when primary channels are idle, in accordance with an embodiment.

FIG. 7 provides depiction of the number of channels extant in the primary network that can potentially be exploited by the secondary network during moments when primary channels are idle. As can be seen, there can be multiple channels in the primary network (e.g., channel 1-channel N), wherein each channel over a period of time can include slots during which data can be received and/or transmitted by a user(s) assigned to utilize the channel for the receipt or transmission of data. As will be appreciated by those of ordinary skill, a primary transmitter or primary receiver will typically not transmit or receive continuously. Thus, there can be slots that may be idle and thus, underutilized. These idle slots (e.g., channels not assigned to a particular primary receiver or transmitter) can be used for transmission/reception by cognitive user devices.

Figure 8:
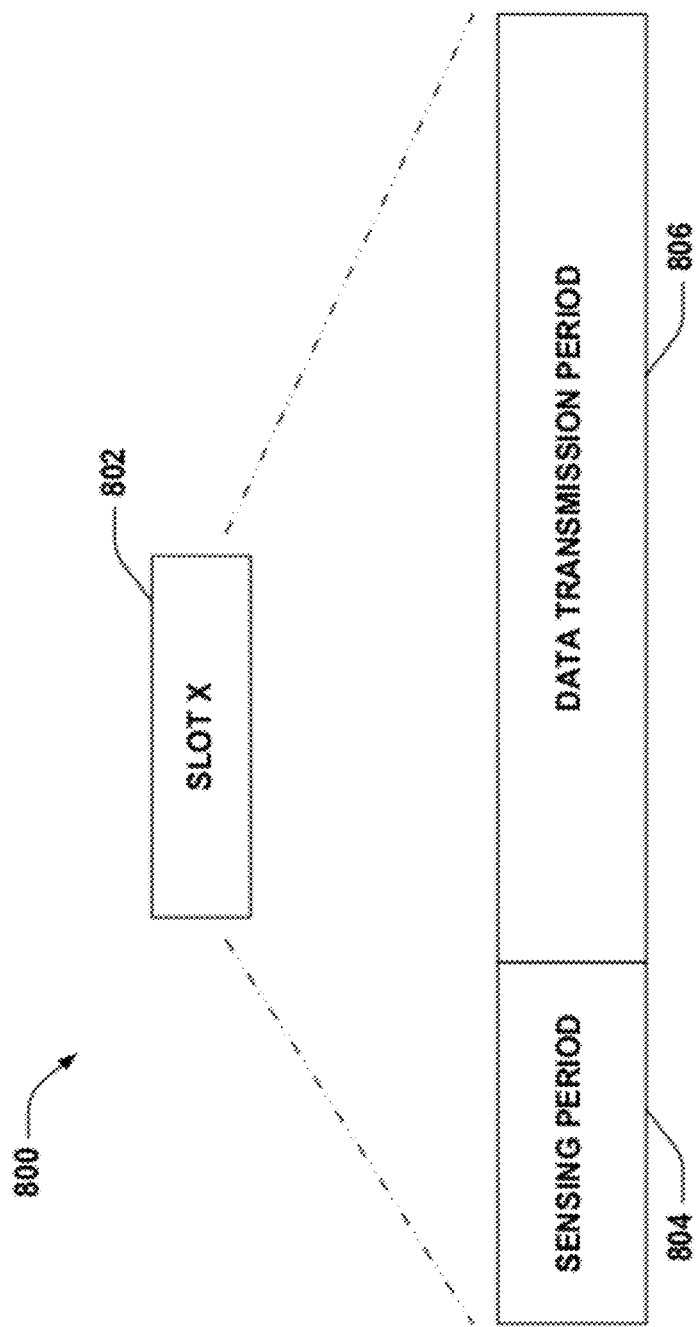
FIG. 8 depicts a slot that can be employed by the described and disclosed system, in accordance with an embodiment.

FIG. 8 provides depiction of a slot X 802 that can be employed by the described and disclosed system, wherein each slot (slot X 802) can be partitioned into a sensing period 804 and a data transmission period 806. During the sensing period 804, cognitive user devices can perform spectrum sensing of their ambient environments for idle channels associated with the primary network, and thereafter can report back to the base station (e.g. base station 108) the results of their spectrum sensing activities. During the data transmission period 806, base station 108 can allocate cognitive user devices to transmit data in accordance with the praxis outlined above, and subsequent to which the cognitive user device can transmit data using assigned idle primary channels.

Figure 9:
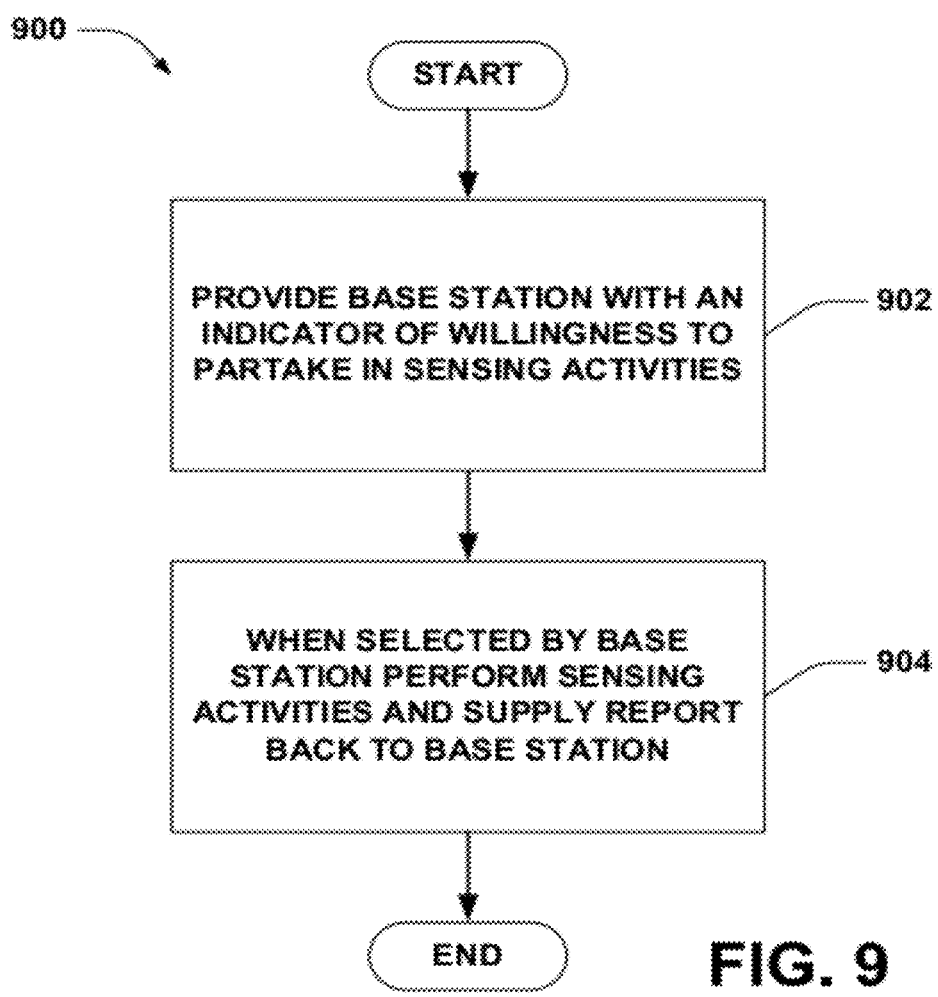
FIG. 9-10 illustrate various processes associated with effectuating fair and efficient channel allocation and spectrum sensing in a wireless regional area network.
Figure 10:
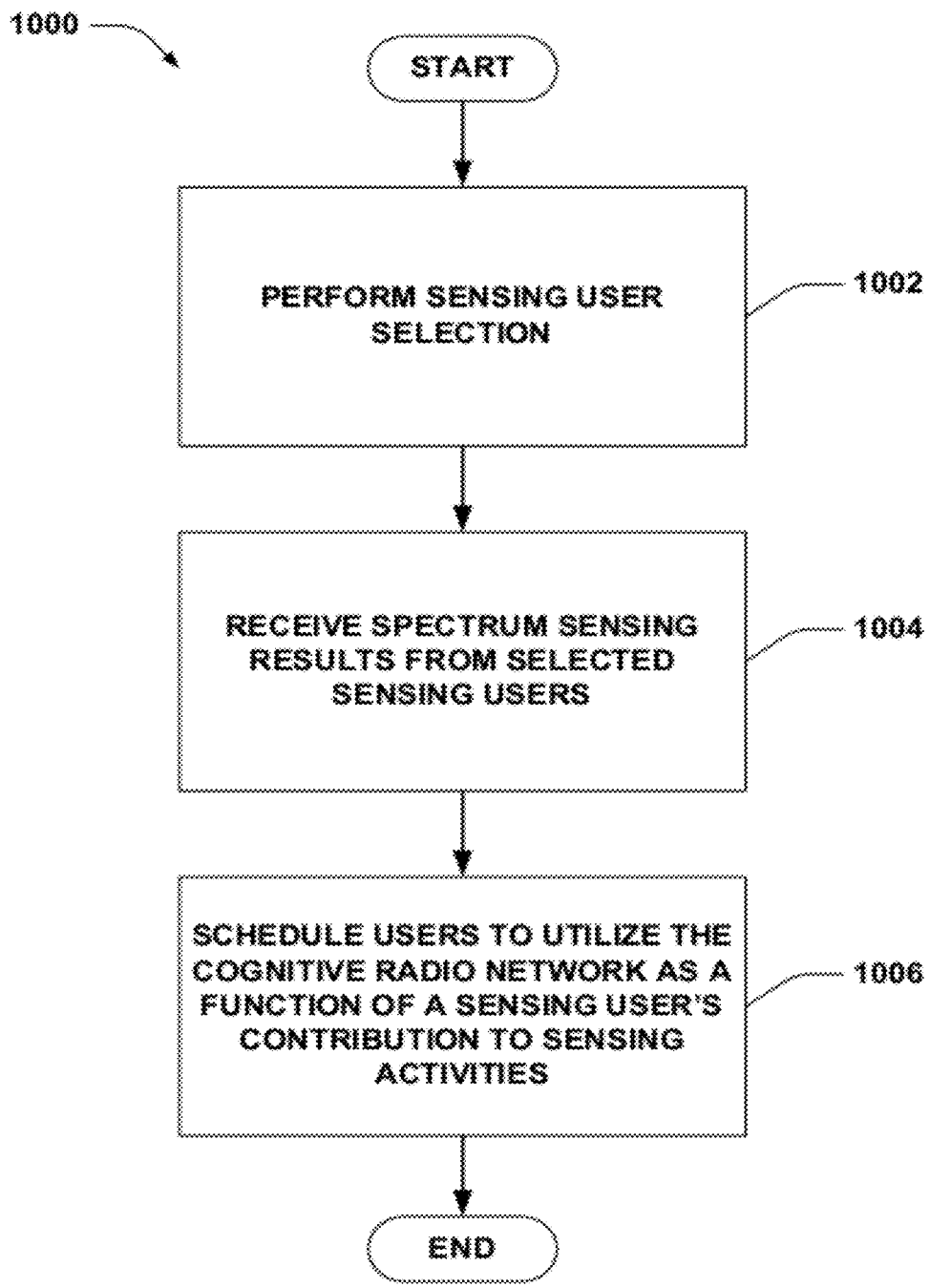

FIGS. 9-10 illustrate methodologies in accordance with the disclosed subject matter. For simplicity of explanation, the methodologies are depicted and described as a series of acts. It is to be understood and appreciated that the subject application is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 provides a flowchart that outlines a process or method 900 for fair and efficient channel allocation and spectrum sensing in a wireless regional area network. The process or method 900 can commence at 902 wherein the cognitive user device can provide to a base station a willingness indicator of the cognitive user device's willingness to partake in spectrum sensing activities. Typically, the willingness indicator can be expressed as a probability. At 904 the cognitive user device can, when selected by the base station, perform sensing of idle channels associated with the primary network and thereafter report back to the base station the number of idle channels that have been sensed.

FIG. 10 provides a further flowchart that outlines a process or method 1000 for fair and efficient channel allocation and spectrum sensing in a wireless regional area network. Process or method 1000 can commence at 1002 where a base station can select a number of cognitive user devices to participate in spectrum sensing. The selection of cognitive user devices can be based on, for example, a sensing willingness indicator vector θ, wherein the base station randomly sends a cognitive user device a request for spectrum sensing through a narrowband control channel. At 1004 the base station can receive from the selected cognitive user devices indications that provide a probability with which the cognitive user device is willing to undertake sensing activities with respect to the primary channels. At 1006, the base station can schedule cognitive user devices to utilize idle primary channels, wherein the sensing contribution of each cognitive user device is taken into consideration. Sensing contribution is typically a function of the number of channels that a particular cognitive user device senses, which in turn can be utilized to determine the priority that will be assigned the cognitive user device by the base station to access idle primary channels. Thus, for purposes of scheduling cognitive user devices to access idle primary channels, the higher the sensing contribution made by a cognitive user device, the higher the access priority to idle primary channels that the cognitive user device will be accorded by the base station. Generally, higher access priorities are accorded cognitive user devices that undertake spectrum sensing, or express a willingness to undertake spectrum sensing, than cognitive users devices that are unwilling to perform spectrum sensing. Moreover, in the group or set of cognitive user devices that express a willingness to perform spectrum sensing, priority to access idle primary channels can be provided to those cognitive user devices that sense a greater number of primary channels.

It should be noted that the willingness indicator disclosed and described herein represents a probability that a cognitive user device has the capability or will have in the future an ability to perform sensing activities. Thus, a cognitive user device, during a self diagnostic phase of operation, for example, can assess whether or not it has sufficient allocable resources or spare capacity to undertake sensing of idle or underutilized primary channels in the surrounding primary network. Where the cognitive user device ascertains that it has sufficient current resources or will have sufficient future allocable resources to undertake sensing of idle or underutilized primary channels in the surrounding primary network, the cognitive user device can return to the base station a willingness indicator that is associated with a relatively high probability; the willingness indicator indicates the cognitive user device's current or future ability/capability to partake in sensing activities associated with detecting idle or underutilized primary channels within the ambient or surround primary network. Where the cognitive user device ascertains that it has insufficient allocable current resources or will have insufficient future resources to undertake sensing of idle or underutilized primary channels in the surrounding primary network, the cognitive user device can return to the base station an unwillingness indicator (or a willingness indicator associated with a relatively low probability) that indicates the cognitive user device's current or future inability to partake in sensing activities.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
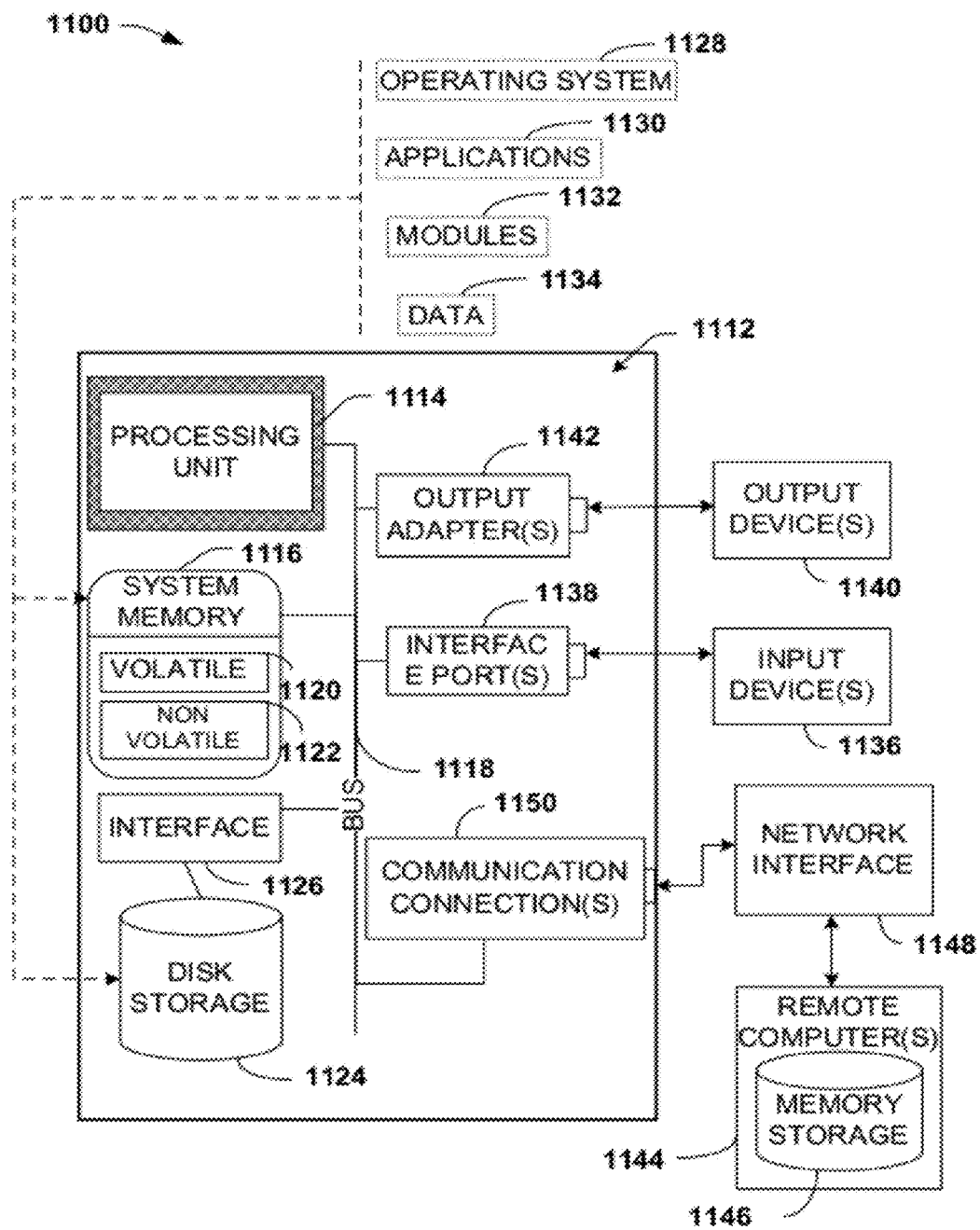
FIG. 11 illustrates a block diagram of a computing system operable to execute the disclosed systems and methods, in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented, e.g., various processes associated with FIGS. 1-10. While the subject matter has been described above in the general context of computer-executable instructions of a computer program that runs on a computer and/or computers, those skilled in the art will recognize that the subject application also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1112 includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1116 includes volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media, networked attached storage (NAS), e.g., SAN storage, etc. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software includes an operating system 1128. Operating system 1128, which can be stored on disk storage 1124, acts to control and allocate resources of computer 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1114 through system bus 1118 via interface port(s) 1138. Interface port(s) 1138 include, for example, a serial port, a parallel port, a game port, and a universal serial bus (USB). Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method comprising:
   on a random-polling basis, sending to a first cognitive user device a request to perform sensing of an idle primary channel;
   in response to the request to perform sensing of the idle primary channel, receiving from the first cognitive user device an attribute that indicates a capability of the first cognitive user device to perform sensing of the idle primary channel; and
   as a function of the attribute and a number of idle primary channels sensed by the first cognitive user device, prioritizing and scheduling the first cognitive user device to transmit data over the idle primary channel in preference to a second cognitive user device that has sensed a lesser number of idle primary channels than the first cognitive user device.

2. The method of claim 1, the scheduling further comprising: as a function of the number of idle primary channels sensed by a second cognitive user device, scheduling the second cognitive user device to transmit data over the idle primary channel sensed by the primary cognitive user device, wherein another attribute returned by the second cognitive user device indicates a lack of a resource to perform sensing of an idle primary channel.

3. The method of claim 1, wherein the request to perform sensing of the idle primary channel is sent to the first cognitive user device over a narrow-band control channel.

4. The method of claim 1, wherein the attribute returned by the first cognitive user device is a probability that the first cognitive user device has an available resource to perform sensing of the idle primary channel.

5. A system, comprising:
   a scheduling component configured to:
   send a first cognitive user device a request to sense an idle channel associated with a primary network; and
   in response to receiving from the first cognitive user device an attribute that indicates a resource availability of the first cognitive user device to sense the primary network or a number of idle channels associated with the primary network sensed by the first cognitive user device, assign the first cognitive user device to transmit data on the idle channel associated with the primary network in preference to a second cognitive user device that has sensed a lesser number of idle channels associated with the primary network.

6. The system of claim 5, wherein the attribute returned by the first cognitive user device represents a probability that the first cognitive user device will have future resources available to sense the idle channel associated with the primary network.

7. The system of claim 5, wherein the scheduling component is further configured to send the request to the first cognitive user device on a narrow-band control channel.

8. The system of claim 5, wherein the scheduling component is further configured to assign the second cognitive user device to transmit data on the idle channel associated with the primary network, wherein a response to the request to sense the idle channel associated with the primary network is received from the second cognitive user device, the response including the attribute that indicates a lack of a future resource to sense the idle channel associated with the primary network.

9. The system of claim 8, wherein the first cognitive user device is given priority to transmit data on the idle channel associated with the primary network over the second cognitive user device to transmit data on the idle channel associated with the primary network based on the attribute that indicates the lack of future resources of the second cognitive user device to sense the idle channel associated with the primary network.

10. The system of claim 8, wherein the first cognitive user device is given priority to transmit data on the idle channel associated with the primary network over the second cognitive user based on the number of idle channels associated with the primary network sensed by the first cognitive user device.

11. A non-transitory computer-readable storage device storing computer executable instructions for causing a processor to execute instructions, the computer executable instructions, comprising:
    sending to a first cognitive user device a request to perform sensing of an idle primary channel;
    receiving from the first cognitive user device an attribute that denotes spare capacity of the first cognitive user device to perform sensing of the idle primary channel, wherein the attribute is received in response to the request to perform sensing of the idle primary channel; and
    scheduling the first cognitive user device to transmit data over the idle primary channel, wherein the scheduling of the first cognitive user device to transmit over the idle primary channel is a function of a greater number of idle primary channels being sensed by the first cognitive user device in relation to a lesser number of idle primary channels being sensed by a second cognitive user device.

12. The non-transitory computer-readable storage device of claim 11, wherein the scheduling of the first cognitive user device to transmit over the idle primary channel is a function of the attribute received in response to the request to perform sensing of the idle primary channel.

13. The non-transitory computer-readable storage device of claim 11, wherein the dispatching of the request to the first cognitive user device is performed on a random-polling basis.

14. A method, comprising:
receiving a request from a base station to sense an idle channel associated with a primary network;
in response to the request from the base station, sending an attribute to the base station indicating an availability of allocable resources to sense the idle channel associated with the primary network; and
receiving an indication from the base station to transmit data over the idle channel, wherein the indication is based on a greater number of idle channels having been sensed in response to the request from the base station in comparison to a lesser number of idle channels having been sensed by another device that responded to the request from the base station and the attribute sent to the base station.

15. The method of claim 14, wherein the attribute that indicates the availability of allocable resources to sense the idle channel associated with the primary network is represented as a probability.

16. A system, comprising:
a sensing module configured to receive a request to sense an idle channel associated with a primary network;
a willingness module configured to return an attribute in response to receipt of the request to sense the idle channel associated with the primary network; and
a transmission module configured to transmit data over the idle channel as a function of a number of idle channels sensed by the sensing module and the attribute, wherein the number of idle channels that were sensed is greater than the number of idle channels that were sensed by a sensing module included in a remote system.

17. The system of claim 16, wherein the attribute represents a probability that the sensing module has available resources to sense the idle channel associated with the primary network.

18. A system, comprising:
means for receiving a request from a base station to sense an idle channel associated with a primary network;
means for sending, in response to receipt of the request from the base station, an attribute indicating available resources to sense the idle channel associated with the primary network, wherein the attribute indicating resources to sense the idle channel associated with the primary network is represented as a probability; and
means for transmitting data, based on a prioritization determined by the base station as a function of a number of idle channels sensed and the probability, on the idle channel, wherein the prioritization differentiates between a greater number of idle channels sensed by a first cognitive user device and a lesser number of idle channels sensed by a second cognitive user device.

* * * * *